United States Patent [19]
Choe

[11] Patent Number: 4,719,281
[45] Date of Patent: Jan. 12, 1988

[54] PENDANT QUINODIMETHANE-CONTAINING POLYMER

[75] Inventor: Eui W. Choe, Randolph, N.J.
[73] Assignee: Hoechst Celanese Corporation, Bridgewater, N.J.
[21] Appl. No.: 854,282
[22] Filed: Apr. 21, 1986
[51] Int. Cl.$^4$ .............................................. C08G 73/06
[52] U.S. Cl. ...................... 528/310; 307/425; 350/356; 528/26; 528/27; 528/33; 528/44; 528/68; 528/75; 528/183; 528/185; 528/188; 528/228; 528/229; 528/288; 528/291; 528/306; 528/342; 528/345; 528/348; 528/353
[58] Field of Search .................... 307/425; 350/356; 528/310, 345, 342, 291, 306, 353, 183, 185, 188, 228, 229, 288, 44, 68, 75, 85, 26, 27, 33, 348

[56] References Cited
U.S. PATENT DOCUMENTS
4,461,887 7/1984 Rogers et al. .................... 528/345

Primary Examiner—Harold D. Anderson
Attorney, Agent, or Firm—Depaoli & O'Brien

[57] ABSTRACT

This invention provides novel polymers which are characterized by a recurring structural unit that contains a pendant quinoid structure and that exhibits nonlinear optical response.

The following structure is illustrative of an invention polymer:

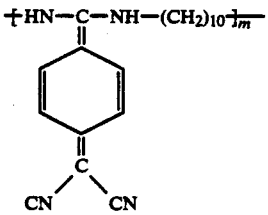

where m is an integer of at least 3.

23 Claims, No Drawings

PENDANT QUINODIMETHANE-CONTAINING POLYMER

This invention was made with Government support under Contract No. F49620-85-C-0047 awarded by the Department of Defense (DOD). The Government has certain rights in this application.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Of more specific interest with respect to the present invention embodiments is prior art relating to tetracyanoquinodimethane compounds, such as U.S. Pat. Nos. 3,115,506; 3,226,389; 3,408,367; 3,681,353; 3,687,987; 3,953,874; 3,981,848; 4,046,563; 4,229,364; 4,478,751; and 4,546,059.

Also of interest are the photoconducting polyamides described in U.S. Pat. No. 3,554,743, which are characterized by a recurring unit of the formula:

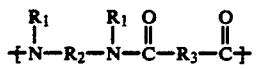

wherein $R_1$ is hydrogen or lower alkyl, $R_2$ and $R_3$ are divalent hydrocarbon radicals, at least one of which is a phenyl or polyphenyl divalent radical.

The above-recited publications and patents are incorporated herein by reference.

There is continuing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide organic compositions which are characterized by a large delocalized conjugated $\pi$-electron system which can exhibit nonlinear optical response.

It is another object of this invention to provide a novel class of polymers which is characterized by a recurring charge asymmetric quinodimethane conjugated structure.

It is another object of this invention to provide high performance nonlinear optical media.

It is a further object of this invention to provide an electrooptic light modulator device with a transparent polymeric nonlinear optical component.

Other objects and advantages of the present invention shall become apparent from the accompanying description and examples.

DESCRIPTION OF THE INVENTION

One or more objects of the present invention are accomplished by the provision of a polymer which is characterized by a recurring structural unit corresponding to the formula:

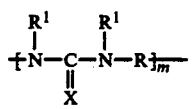

I.

where R is a divalent organic radical containing between about 2–20 carbon atoms; $R^1$ is hydrogen or a $C_1$–$C_{20}$ alkyl group; m is an integer of at least 3; and X is a pendant quinoid substituent selected from

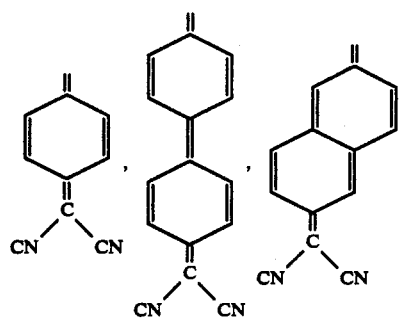

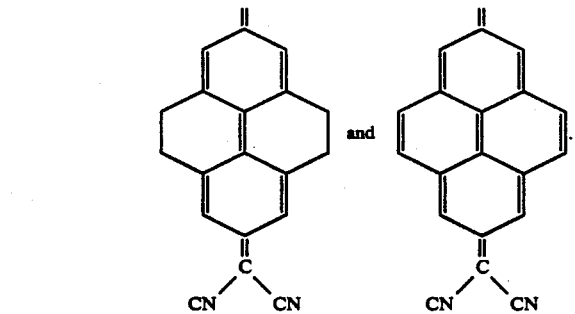

The two $R^1$ substituents in Formula I above taken together with the connecting elements can form a heterocyclic ring structure, such as 1,3-diazacyclopentane and 1,3-diazacyclohexane.

Because of the presence of a recurring charge asymmetric quinodimethane structual unit in the polymer represented by Formula I above, the polymer exhibits nonlinear optical response.

A present invention polymer with a noncentrosymmetric molecular configuration can exhibit a second order nonlinear optical susceptibility $\beta$ of at least about $5 \times 10^{-30}$ esu as measured at 1.91 $\mu$m excitation wavelength, a second order susceptibility $\chi^{(2)}$ of at least about $1 \times 10^{-6}$ esu, and a Miller's delta of at least about one square meter/coulomb.

A present invention polymer with a centrosymmetric molecular configuration can exhibit a third order nonlinear optical susceptibility $\gamma$ of at least about $1 \times 10^{-36}$ esu as measured at 1.91 $\mu$m excitation wavelength.

A present invention polymer typically will have an average molecular weight in the range between about 1000–1,000,000.

A polyamine composition in accordance with Formula I above normally will have an Intrinsic Viscosity (I.V.) of about 0.5–2, when measured as a 0.5% solution in a solvent such as dimethylsulfoxide, N-methyl-2-pyrrolidinone, and the like.

The divalent organic radical R in Formula I above can contain one or more aliphatic, alicyclic or aromatic moieties. Illustrative of the divalent organic radical R are substituents containing one or more alkylene, oxyalkylene, estero, urethano, carbonyl, sulfono, siloxyl, imido, amido or cyclic structures.

In another embodiment, this invention provides a transparent nonlinear optical medium comprising a polymer which is characterized by a recurring structural unit corresponding to the formula:

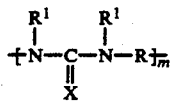

where R, $R^1$, m and X are as defined in Formula I above.

A present invention transparent optical medium can have an external field-induced uniaxial orientation of the recurring pendant quinoid substituents, and additionally can have a macroscopic orientation of the main chain polymeric structures.

In another embodiment, this invention provides a nonlinear optical medium comprising a transparent solid substrate with a surface coating of at least one monolayer of a polymer which is characterized by a recurring structural unit corresponding to the formula:

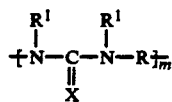

where R, $R^1$, m and X are as defined in Formula I above.

As more fully described hereinbelow, the surface coating on the transparent solid substrate preferably is a Langmuir-Blodgett deposition of at least one monolayer of uniaxial aligned polymer molecules.

In another embodiment, this invention provides an electrooptic light modulator device with a polymeric nonlinear optical component comprising a transparent solid medium of a polymer which is characterized by a recurring structural unit corresponding to the formula:

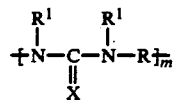

where R, $R^1$, m and X are as defined in Formula I above.

Illustrative of preferred embodiments, this invention provides:

(a) a polymer which is characterized by a recurring structural unit corresponding to the formula:

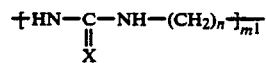

where n is an integer between about 2–30; $m^1$ is an integer between about 3–300; and X is a pendant quinoid substituent as defined in Formula I above;

(b) a polymer which is characterized by a recurring structural unit corresponding to the formula:

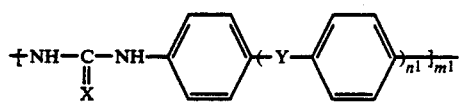

where $n^1$ is an integer between about 0–5; $m^1$ is an integer between about 3–300; Y is —O—, —S—, —(CH$_2$)$_{1-10}$—, —C(CH$_3$)$_2$—, —OCH$_2$CH$_2$O—, —CH=CH—, —C≡C—, or a covalent bond; and X is a pendant quinoid substituent as defined in Formula I above;

(c) a polymer which is characterized by a recurring structural unit corresponding to the formula:

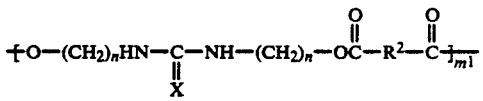

where n is an integer between about 2–30; $m^1$ is an integer between about 3–300; $R^2$ is a divalent radical selected from

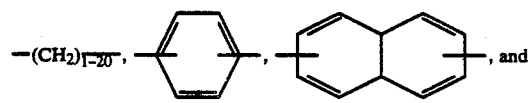

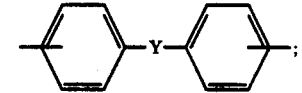

Y is —O—, —S—, —(CH$_2$)$_{1-10}$—, —C(CH$_3$)$_2$—, —OCH$_2$CH$_2$CH$_2$O—, —CH=CH, —C≡C—, or a covalent bond; and X is a pendant quinoid substituent as defined in Formula I above;

(d) a polymer which is characterized by a recurring structural unit corresponding to the formula:

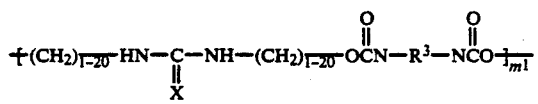

where $m^1$ is an integer between about 3-300; $R^3$ is a divalent radical selected from

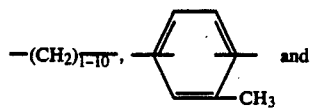

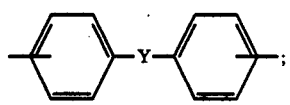

Y is —O—, —S—, —(CH$_2$)$_{1-10}$, —C(CH$_3$)$_2$—, —OCH$_2$CH$_2$O—, —CH=CH—, —C≡C—, or a covalent bond; and X is a pendant quinoid substituent as defined in Formula I above;

(e) a polymer which is characterized by a recurring structural unit corresponding to the formula:

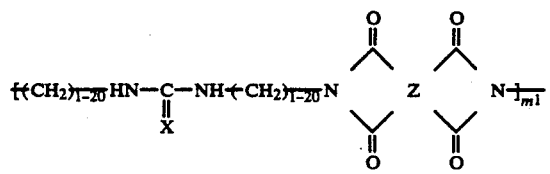

where $m^1$ is an integer between about 3-300; Z is a tetravalent radical selected from

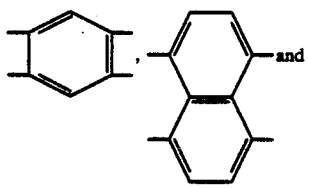

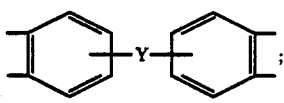

Y is —O—, —S—, —(CH$_2$)$_{1-10}$—, —C(CH$_3$)$_2$—, —OCH$_2$CH$_2$O—, —CH=CH—, —C≡C—, or a covalent bond; and X is a pendant quinoid substituent as defined in Formula I above;

(f) a polymer which is characterized by a recurring structural unit corresponding to the formula:

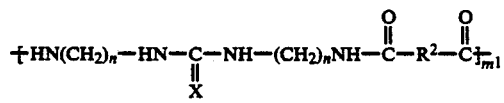

where $m^1$ is an integer between about 3-300; n is an integer between about 0-30; $R^2$ is a divalent radical selected from

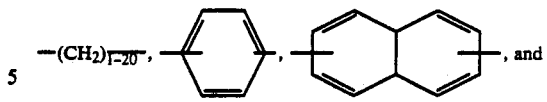

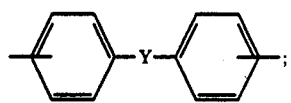

Y is —O—, —S—, —(CH$_2$)$_{1-10}$, —C(CH$_3$)$_2$—, —OCH$_2$CH$_2$O—, —CH=CH—, —C≡C—, or a covalent bond; and X is a pendant quinoid substituent as defined in Formula I above; and (g) a polymer which is characterized by a recurring structural unit corresponding to the formula:

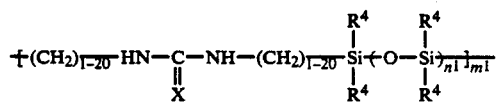

where $m^1$ is an integer between about 3-300; $R^4$ is an alkyl, haloalkyl or aromatic group containing between about 1-10 carbon atoms; $n^1$ is an integer between about 1-100; and X is a pendant quinoid substituent as defined in Formula I above.

In all of the above defined polymers, each amine group can have a $C_1$-$C_{20}$ alkyl substituent in place of the hydrogen atom, which is advantageous for purposes of Langmuir-Blodgett molecular depositions on substrates.

SYNTHESIS OF POLYMERS

The production of a polyamine type of invention polymer is illustrated by the following Flow Diagram I:

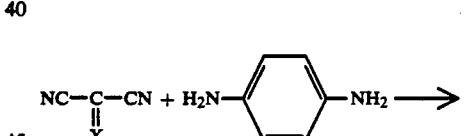

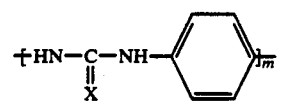

The production of a polyurethane type of invention polymer is illustrated by the following Flow Diagram II:

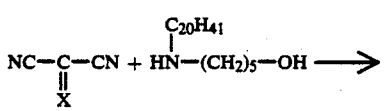

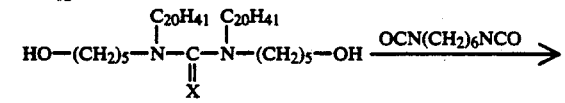

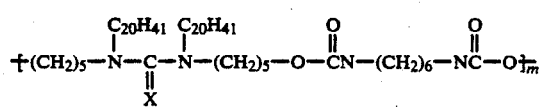

The production of a polyester type of invention polymer is illustrated by the following Flow Diagram III:

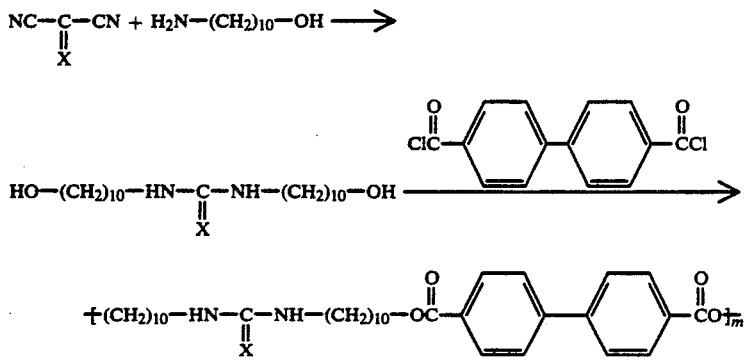

The production of a polyamide type of invention polymer is illustrated by the following Flow Diagram IV:

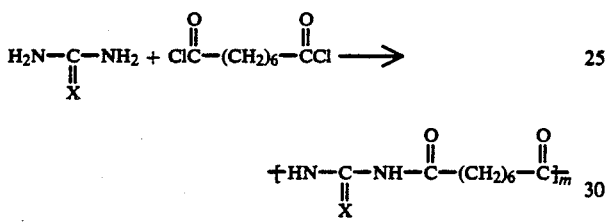

The production of a polyimide type of invention polymer is illustrated by the following Flow Diagram V:

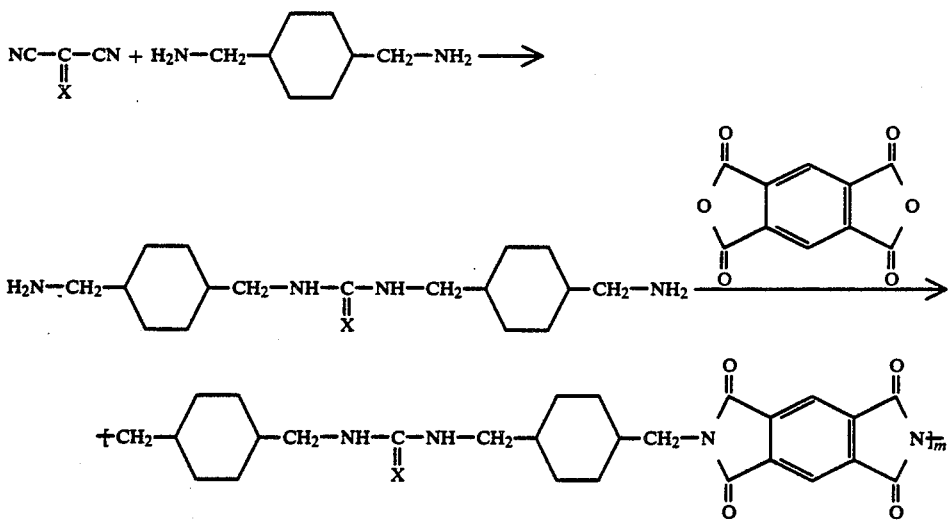

In the above Flow Diagrams the designations X and m are as previously defined. As indicated in the Flow Diagrams, reactants can be selected so that R in Formula I above can include a diversity of structural groups such as polyalkylene, ester, urethane, carbonyl, imide, diphenylene, siloxane, and the like.

Illustrative of amine reactants are ethylenediamine; hexamethylenediamine; 4,4-dimethylheptamethylenediamine; 1,2-bis(3-aminopropoxyethane); 3-methoxyhexamethylenediamine; 1,4-diaminocyclohexane; bis(3-aminopropyl)sulfide; m-phenylenediamine; 2,2-bis(4-aminophenyl)propane; 4,4'-methylenedianiline; benzidine; 4,4'-diaminodiphenyl sulfide; 4,4'-diaminodiphenyl sulfone; 4,4'-diaminodiphenyl ether; 1,5-diaminonaphthalene; p-xylylenediamine; di(4-aminocyclohexyl)methane; 2-aminoethanol; and the like. Each amine group in the illustrated compounds additionally can have a $C_1$–$C_{20}$ alkyl substituent.

Illustrative of isocyanate reactants are ethylenediisocyanate; hexamethylenediisocyanate; 3-isocyanatomethyl-3,5,5-trimethylcyclohexylisocyanate; 5-chloro-1,3-benzenediisocyanate; bis(3-methyl-4-isocyanatocyclohexyl)methane; toluenediisocyanate; isophorone diisocyanate; 2,2-di(4-isocyanatophenyl)propane; diisocyanate derivatives produced by the phosgene-conversion of the diamine compounds listed above; and the like.

Illustrative of ester-forming and imide-forming reactants are acyl halide derivatives of dicarboxylic acids such as oxalic acid; adipic acid; azelaic acid; sebacic acid; 1,4-cyclohexanedicarboxylic acid; phthalic acid; isophthalic acid; terephthalic acid; 4,4'-biphenyldicarboxylic acid; 1,4-naphthalenedicarboxylic acid; 2,6-naphthalenedicarboxylic acid; 4,4'-diphenyletherdicarboxylic acid; 4,4'-diphenylmethanedicarboxylic acid; 4,4'-diphenylsulfonedicarboxylic acid; and the like.

Illustrative of imide-forming reactants are anhydride compounds such as pyromellitic dianhydride; 2,3,6,7-naphthalenetetracarboxylic acid anhydride; 2,2',3,3'- diphenyltetracarboxylic acid anhydride; thiophene-2,3,4,5-tetracarboxylic acid anhydride; 2,2-bis(3,4-dicarboxyphenyl)propane dianhydride; 3,4-dicarboxyphenyl sulfone dianhydride; bis(3,4-dicarboxyphenyl) ether dianhydride; ethylenetetracarboxylic acid dianhydride; 3,4,3',4'-benzophenonetetracarboxylic acid dianhydride; and the like.

Other suitable diamine and dicarboxylate types of reactants are described in U.S. Pat. Nos. 2,130,948; 2,244,192; 2,902,475; 3,094,511; and 3,554,743; incorporated herein by reference.

The reactions illustrated in the above Flow Diagrams generally are conducted in an organic solvent medium such as tetrahydrofuran at a temperature between about 20°–150° C. for a reaction period between about 0.5–48 hours, as appropriate to complete the desired reaction.

NONLINEAR OPTICAL PROPERTIES

The term "Miller's delta" as employed herein with respect to second harmonic generation (SHG) is defined by an equation as elaborated by Garito et al in Chapter 1, "Molecular Optics:Nonlinear Optical Properties Of Organic And Polymeric Crystals"; ACS Symposium Series 233 (1983).

The quantity "delta"( ) is defined by the equation:

$$d_{ijk} = \epsilon_0 \chi_{ii}^{(1)} \chi_{jj}^{(1)} \chi_{kk}^{(1)} \delta_{ijk}$$

where terms such as $\chi_{ii}$ are representative linear susceptibility components, and $d_{ijk}$, the second harmonic coefficient, is defined through $$\chi_{ijk}^{(2)}(-2\omega; \omega, \omega) = 2 d_{ijk}(-2\omega; \omega, \omega)$$

The Miller's delta ($10^{-2}$ m$^2$/c at 1.06 μm) of various nonlinear optical crystalline substrates are illustrated by KDP(3.5), LiNbO$_3$(7.5), GaAs(1.8) and 2-methyl-4-nitroaniline(160).

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic waves is phase matched in the medium. Phase matching can provide a high conversion percentage of the incident light to the second harmonic wave.

The term "external field" as employed herein refers to an electric, magnetic or mechanical stress field which is applied to a substrate of mobile organic molecules, to induce dipolar alignment of the molecules parallel to the field.

The term "optically transparent" as employed herein refers to an optical medium which is transparent or light transmitting with respect to incident fundamental and created light frequencies. In a nonlinear optical device, a present invention nonlinear optical medium can be transparent to both the incident and exit light frequencies.

The term "charge asymmetric" as employed herein refers to the dipolarity characteristic of organic molecules containing an electron-withdrawing group which is in conjugation with an electron-donating group. There is an asymmetric distribution of electron density in the π-electron structure of the organic molecules.

The fundamental concepts of nonlinear optics and their relationship to chemical structures can be expressed in terms of dipolar approximation with respect to the polarization induced in an atom or molecules by an externally applied optical electric field.

As summarized in the ACS Symposium Series 233 (1983), the fundamental equation (1) below describes the change in the electron distribution occurring between the molecular ground and excited states expressed as a power series of the electric field E which occurs upon interaction of such a field, as in the electric component of the electromagnetic radiation, with single molecules. The coefficient $\alpha$ is the linear polarizability, $\beta$ and $\gamma$ are the second and third order molecular susceptibilities, respectively. The coefficients for these molecular susceptibilities are tensor quantities and therefore highly symmetry dependent. Odd order coefficients are nonvanishing for all structures on the molecular and unit cell level. The even order coefficients such as $\beta$ are zero for those structures which have a center of inversion symmetry on the molecular and/or unit cell level.

Equation (2) is identical with (1) except that it describes a macroscopic polarization, such as that arising from an array of molecules in a macroscopic sample.

$$p = \alpha E + \beta E E + \gamma E E E + \ldots \quad (1)$$

$$P = P_0 + \chi^{(1)} E + \chi^{(2)} E E + \chi^{(3)} E E E + \ldots \quad (2)$$

A present invention organic medium typically is optically transparent and exhibits nonlinear optical properties such as second harmonic and third harmonic generation, and the linear electrooptic (Pockels) effect. For second harmonic generation, the bulk phase of the organic substrate whether liquid or solid does not possess a real or orientational average inversion center. The substrate is a macroscopic noncentrosymmetric structure.

Harmonic generation measurements relative to quartz can be performed to establish the value of second order and third order nonlinear optical susceptibility of the substrates.

In the case of macroscopic nonlinear optical media that are composed of noncentrosymmetric sites on the molecular and unit cell level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3, \omega_1, \omega_2) = N f^{\omega_3} f^{\omega_2} f^{\omega_1} <\beta_{ijk}(-\omega_3; \omega_1, \omega_2)>$$

wherein N is the number of sites per unit volume, f represents small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al. in chapter 1 of the ACS Symposium Series 233 (1983) recited hereinabove; and by Lipscomb et al. in J. Chem., Phys., 75, 1509 (1981), incorporated by reference. See also Lalama et al., Phys. Rev., A20, 1179

(1979); and Garito et al., Mol. Cryst. and Liq. Cryst., 106, 219 (1984); incorporated by reference.

EXTERNAL FIELD-INDUCED MICROSCOPIC NONLINEARITY

The microscopic response, or electronic susceptibility $\beta$, and its frequency dependence or dispersion, is experimentally determined by electric field-induced second harmonic generation (DCSHG) measurements of liquid solutions or gases as described in "Dispersion Of The Nonlinear Second Order Optical Susceptibility Of Organic Systems", Physical Review B, 28 (No. 12), 6766 (1983) by Garito et al., and the Molecular Crystals publication cited above.

In the measurements, the created frequency $\omega_3$ is the second harmonic frequency designated by $2\omega$, and the fundamental frequencies $\omega_1$ and $\omega_2$ are the same frequency designated by an applied DC field removes the natural center of inversion symmetry of the solution, and the second harmonic signal is measured using the wedge Maker fringe method. The measured polarization at the second harmonic frequency $2\omega$ yields the effective second harmonic susceptibility of the liquid solution and thus the microscopic susceptibility $\beta$ for the molecule.

A present invention polymer exhibits a large $\beta$ value because it is characterized by recurring noncentrosymmetric quinodimethane structures.

SOLID ORGANIC GUEST-HOST SUBSTRATES

In a further embodiment this invention provides nonlinear optically transparent host polymeric substrates having incorporated therein a distribution of guest molecules of a present invention quinodimethane-containing polymer.

Illustrative of this type of optical substrate is a polymethyl methacrylate film containing a distribution of present invention polymer molecules containing repeating quinodimethane structures.

If the distribution of guest molecules is random, there is orientational averaging by statistical alignment of the dipolar molecules in the polymeric host, and the optical substrate exhibits third order nonlinearity ($\chi^{(3)}$).

If the distribution of guest molecules is at least partially uniaxial in molecular orientation, then the optical substrate exhibits second order nonlinearity ($\chi^{(2)}$). One method for preparing polymeric films with large second order nonlinear coefficients is to remove the orientational averaging of a dopant molecule with large $\beta$ by application of an external DC electric field to a softened film. This can be accomplished by heating the film above the host polymer glass transition temperature $T_g$, then cooling the film below $T_g$ in the presence of the external field. The poling provides the alignment predicted by the Boltzmann distribution law.

The formation of a thin host polymer substrate containing guest molecules having, for example, uniaxial orthogonal molecular orientation can be achieved by inducing a dipolar alignment of the guest molecules in the substrate with an externally applied field of the type described above.

In one method a thin film of the host polymer (e.g., polymethyl methacrylate) containing guest molecules is cast between electrode plates. The host polymer substrate then is heated to a temperature above the second order transition temperature of the host polymer. A DC electric field is applied (e.g., at a field strength between about 400–100,000 V/cm) for a period sufficient to align the guest molecules in a unidirectional configuration parallel to the transverse field. Typically the orientation period will be in the range between about one second and one hour, as determined by factors such as guest molecular weight and field strength.

When the orientation of guest molecules is complete, the host polymer substrate is cooled below its glass transition temperature, while the substrate is still under the influence of the applied DC electric field. In this manner the uniaxial molecular orientation of guest molecules is immobilized in a rigid structure.

The uniaxial molecular orientation of the guest molecules in the host polymer substrate can be confirmed by X-ray diffraction analysis. Another method of molecular orientation measurement is by optical characterization, such as optical absorption measurements by means of spectrophotometer with a linear polarization fixture.

External field-induced orientation of present invention polymer molecules can also be accomplished with a concentration of the polymer molecules per se, i.e., without the presence of a host medium. In this case, the glass transition temperature of the invention polymer is a controlling factor.

LANGMUIR-BLODGETT DEPOSITION TECHNIQUE

The Langmuir-Blodgett technique is reviewed in J. Macromol. Sci.-Rev. Macromol. Chem., C21(1), 61 (1981); incorporated herein by reference.

An extensive elaboration of Langmuir-Blodgett technology is published in Thin Solid Films, Vol., 99 (1983), which includes papers presented at the First International Conference On Langmuir-Blodgett Films, Durham, Great Britain, Sept. 20–22, 1982; Elsevier Sequoia S. A., Lausanne; incorporated herein by reference.

In 1917 Irving Langmuir developed the experimental and theoretical concepts which underlie out understanding of the behavior of organic molecules in insoluble monolayers on the surface of water. Langmuir demonstrated that long-chain fatty acids on the surface of water form films in which the molecules occupy the same cross-sectional area whatever the chain length of the molecules. The films are one molecule thick, and the molecules are oriented at the water surface, with the polar functional group immersed in the water and the long nonpolar chain directed nearly vertically up from the water surface.

This understanding of the nature of insoluble monolayers was facilitated by the development of a surface balance, which is associated with Langmuir's name.

In 1919 Langmuir reported a development in which fatty acid monolayers on water surfaces were transferred to solid supports such as glass slides. In 1933 Katherine Blodgett announced the discovery that sequential monolayer transfer could be accomplished to form built-up multilayer films, i.e., unitary laminate structures now universally referred to as "Langmuir-Blodgett films".

Grunfeld et al in Thin Solid Films, 99, 249 (1983) demonstrate the application of a Langmuir-Blodgett layer as a potentially useful integrated optics component by employing the optical absorption anisotropy of a diacetylene film in a polarization mode filter.

The present invention pendant quinodimethane-containing polymers are amenable to Langmuir-Blodgett deposition procedures for the formation of monolayer and multilayer continuous film coatings on solid substrates such as optical glass.

The following examples are further illustrative of the present invention. The components and specific ingredients are presented as being typical, and various modifications can be derived in view of the foregoing disclosure within the scope of the invention.

EXAMPLE I

This Example illustrates the preparation of poly(7,7-iminododecamethyleneimino-8,8-dicyanoquinodimethane).

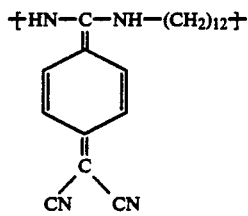

A 300 ml three-necked flask equipped with a mechanical stirrer, addition funnel, and nitrogen inlet and outlet is charged with 10 g (49 mmoles) of 7,7,8,8-tetracyanoquinodimethane and 150 ml of N-methyl-2-pyrrolidone. To the mixture is added a 9.82 g (49 mmoles) quantity of 1,12-diaminododecane in 20 ml of N-methyl-2-pyrrolidone. The resulting reaction mixture is stirred at 25° C. for two days.

The reaction mixture is poured into distilled water to precipitate a solid, which is filtered, washed with water, 10% ammonium hydroxide solution, and then acetone. The recovered solid is dried at 100° C. for 16 hours at 0.1 Torr to provide the poly(7,7-iminododecamethyleneimino-8,8-dicyanoquinodimethane) product.

The polymer exhibits an exotherm at 286° C., and has a molecular weight in the range between about 4000–6000.

EXAMPLE II

This Example illustrates the preparation of poly(7,7-iminooctamethyleneimino-8,8-dicyanoquinodimethane).

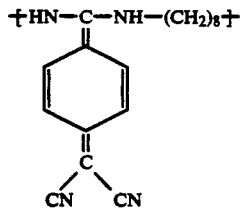

Following the procedure described in Example I, 10 g (49 mmoles) of 7,7,8,8-tetracyanoquinodimethane and 7.07 g (49 mmoles) of 1,8-diaminooctane are reacted in N-methyl-2-pyrrolidone medium to yield 11.2 g of the poly(7,7-iminooctamethyleneimino-8,8-dicyanoquinodimethane) product.

The polymer exhibits an exotherm at 301° C., and has a molecular weight in the range between about 10,000–15,000.

EXAMPLE III

This Example illustrates the preparation of poly(7,7-iminoheptamethyleneimino-8,8-dicyanoquinodimethane).

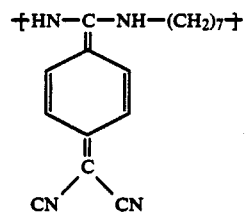

Following the procedure of Example I, a N-methyl-2-pyrrolidone solution of 10 g (49 mmoles) of 7,7,8,8-tetracyanoquinodimethane and 6.38 g (49 mmoles) of 1,7-diaminoheptane is reacted at ambient temperature for two days to yield 12 g of the poly(7,7-iminoheptamethyleneimino-8,8-dicyanoquinodimethane) product.

The polymer exotherms at 306° C., and exhibits a uv-visible absorption maximum at 374 nm in dimethyl sulfoxide. The polymer has a molecular weight in the range of 6000–9000.

EXAMPLE IV

This Example illustrates the preparation of poly(7,7-iminononamethyleneimino-8,8-dicyanoquinodimethane).

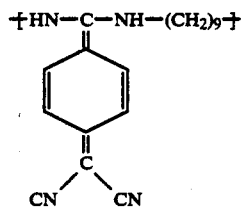

Following the procedure of Example I, a N-methyl-2-pyrrolidone solution of 10 g (49 mmoles) of 7,7,8,8-tetracyanoquinodimethane and 7.75 g (49 mmoles) of 1,9-diaminononane is reacted at ambient temperature for two days to yield 9.7 g of the poly(7,7-iminononamethyleneimino-8,8-dicyanoquinodimethane) product.

The polymer exotherms at 304° C., and exhibits a uv-visible absorption maximum at 371 nm in dimethyl sulfoxide. The polymer has a molecular weight in the range of 5000–7000.

EXAMPLE V

This Example illustrates the preparation of poly(7,7-iminodecamethyleneimino-8,8-dicyanoquinodimethane).

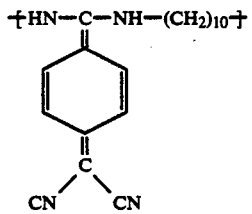

Following the procedure of Example I, a N-methyl-2-pyrrolidone solution of 10 g (49 mmoles) of 7,7,8,8-tetracyanoquinodimethane and 8.44 g (49 mmoles) of 1,10-diaminodecane is reacted to yield 12 g of the poly(7,7-iminodecamethyleneimino-8,8-dicyanoquinodimethane) product.

The polymer exotherms at 287° C., and has a molecular weight in the range between about 5000–7000.

EXAMPLE VI

This Example illustrates the preparation of 1:1 poly[7,7-iminoheptamethyleneimino-8,8-dicyanoquinodimethane)(7,7-iminododecamethyleneimino-8,8-dicyanoquinodimethane)].

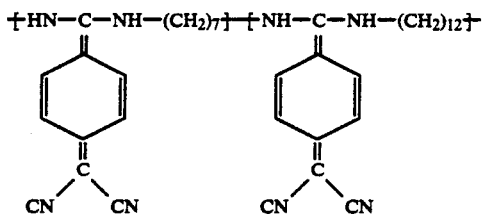

Following the procedure of Example I, a N-methyl-2-pyrrolidone solution of 10 g (49 mmoles) of 7,7,8,8-tetracyanoquinodimethane, 3.19 g (24.5 mmoles) of 1,7-diaminoheptane and 4.19 g (24.5 mmoles) of 1,12-diaminododecane is reacted at ambient temperature for two days to yield 12 g of the copolymer product.

The polymer exotherms at 292° C., and exhibits a uv-visible absorption maximum at 374 nm in dimethyl sulfoxide. The copolymer has a molecular weight in the range of 8000–10,000.

EXAMPLE VII

This Example illustrates the preparation of poly(7,7-imino-m-phenyleneimino-8,8-dicyanoquinodimethane).

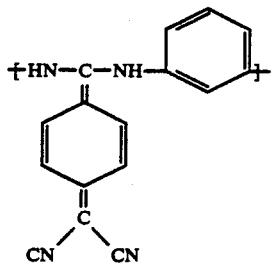

Following the procedure of Example I, a N-methyl-2-pyrrolidone solution of 10 g (49 mmoles) of 7,7,8,8-tetracyanoquinodimethane and 5.3 g (49 mmoles) of m-phenylenediamine is reacted at ambient temperature for three days to yield the poly(7,7-imino-m-phenyleneimino-8,8-dicyanoquinodimethane) product.

The polymer has a molecular weight in the range of 4000–6000.

EXAMPLE VIII

This Example illustrates the preparation of poly(7,7-imino-4,4'-stilbeneimino-8,8-dicyanoquinodimethane).

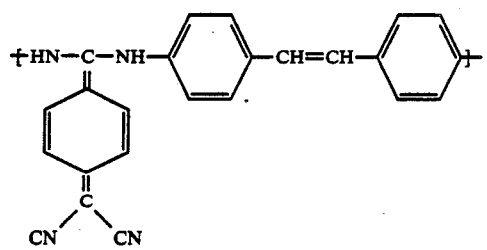

Following the procedure of Example I, a N-methyl-2-pyrrolidone solution of 10 g (49 mmoles) of 7,7,8,8-tetracyanoquinodimethane and 13.88 g (49 mmoles) of 4,4'-diaminostilbene is reacted at ambient temperature for six days to yield the poly(7,7-imino-4,4'-stilbeneimino-8,8-dicyanoquinodimethane) product.

The polymer has a molecular weight in the range of 2000–5000.

EXAMPLE IX

This Example illustrates the preparation of poly(7,7-imino-4-phenoxy-4-phenoxy-4-phenylimino-8,8-dicyanoquinodimethane).

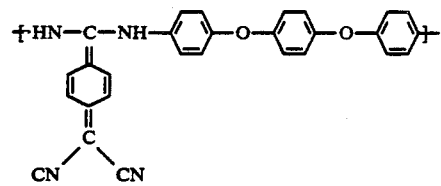

Following the procedure of Example I, a N-methyl-2-pyrrolidone solution of 10 g (49 mmoles) of 7,7,8,8-tetracyanoquinodimethane and 14.3 g (49 mmoles) of dioxyphenyldianiline is reacted at ambient temperature for three days to yield the poly (7,7-imino-4-phenoxy-4-phenoxy-4-phenylimino-8,8-dicyanoquinodimethane) product.

The polymer exotherms at 243° C., and exhibits a uv-visible absorption maximum at 488 nm (log $\epsilon = 4.45$) in dimethyl sulfoxide. The polymer has a molecular weight in the range of 12,000–15,000.

EXAMPLE X

This Example illustrates the preparation of a copolymer which contains repeating dicyanoquinodimethane and phthalimide structures.

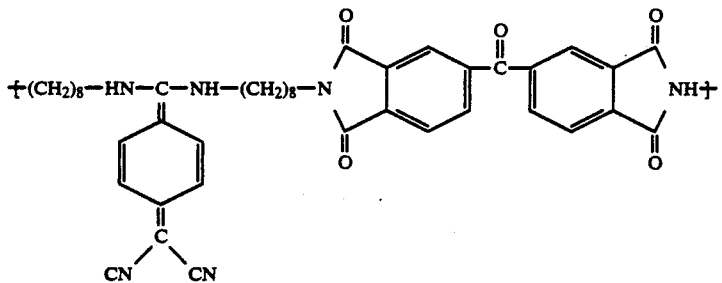

Following the procedure of Example I, a N-methyl-2-pyrrolidone solution of 10 g (49 mmoles) of 7,7,8,8-tetracyanoquinodimethane, 14.1 g (98 mmoles) of 1,8-diaminooctane and 16.1 g (49 mmoles) of 3,3',4,4'-benzophenonetetracarboxylic acid dianhydride is reacted at ambient temperature for three days to yield a copolymer product corresponding to the illustrated formula. The copolymer has a molecular weight in the range of 12,000–18,000.

A solution of the copolymer in N-methyl-2-pyrrolidone is spin-coated on electroconductive glass to form a transparent medium for use as a nonlinear optical component of an electrooptic light modulator device.

EXAMPLE XI

This Example illustrates the preparaton of poly(7,7-iminohexamethylenetere/isophthalohexamethyleneimino-8,8-dicyanoquinodimethane).

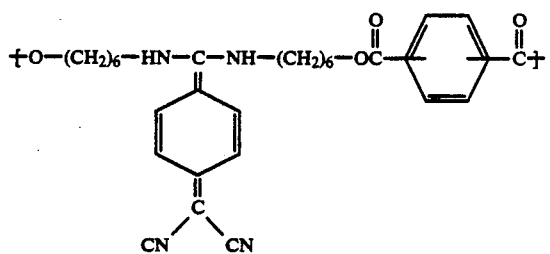

A 3 liter three-necked flask equipped with a mechanical stirrer, and an addition funnel and nitrogen inlet and outlet, is charged with 10 g (49 mmoles) of 7,7,8,8-tetracyanoquinodimethane and 1400 ml of tetrahydrofuran. The mixture is heated to 50° C., and a 23.44 g (200 mmoles) quantity of 6-amino-1-hexanol in 50 ml of tetrahydrofuran is added.

The resulting reaction mixture is stirred at 25° C. for four days. After concentration of the reaction mixture, the product separates as a precipitate. The precipitate is filtered, washed with water, neutralized with 10% ammonium hydroxide, and washed with water three times. The resulting oil crystallizes on standing overnight to yield 13 g of brown solid. The crude solid is treated with diethyl ether to provide 12.4 g of 7,7-bis(1-hydroxyhexylamino)-8,8-dicyanoquinodimethane, m.p. 120° C.

A methylene chloride solution of 38.4 g (0.1 mole of 7,7-bis(hydroxyhexylamino)-8,8-dicyanoquinodimethane and 70 ml of triethylamine is reacted with a mixture of 12.18 g (0.06 mole) of isophthaloyl dichloride and 8.12 g (0.04 mole) of terephthaloyl dichloride to produce the copolyester product.

EXAMPLE XIII

This Example illustrates the preparation of poly(7,7-iminohexamethylene-1,6-hexanedicarbamatohexamethylene-8,8-dicyanoquinodimethane).

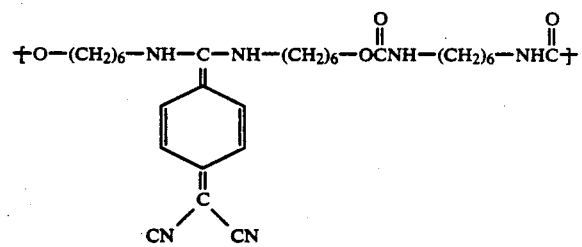

A 3 liter three-necked flask equipped with a mechanical stirrer, and an addition funnel and nitrogen inlet and outlet, is charged with 10 g (49 mmoles) of 7,7,8,8-tetracyanoquinodimethane and 1400 ml of tetrahydrofuran. The mixture is heated to 50° C., and a 23.44 g (200 mmoles) quantity of 6-amino-1-hexanol in 50 ml of tetrahydrofuran is added.

The resulting reaction mixture is stirred at 25° C. for four days. After concentration of the reaction mixture, the product separates as a precipitate. The precipitate is filtered, washed with water, neutralized with 10% ammonium hydroxide, and washed with water three times. The resulting oil crystallizes on standing overnight to yield 13 g of brown solid. The crude solid is treated with diethyl ether to provide 12.4 g of 7,7-bis(1-hydroxyhexylamino)-8,8-dicyanoquinodimethane, m.p. 120° C.

A 38.4 g (0.1 mole) quantity of 7.7-bis(1-hydroxyhexylamino)-8,8-dicyanoquinodimethane is reacted with 16.8 g (0.1 mole) of 1,6-diisocyanatohexane to produce the copolymer product containing repeating dicyanoquinodimethane and urethane structures.

EXAMPLE XIV

This Example illustrates the preparation of poly(7,7-iminooctamethyleneterephthalamidoooctamethyleneimino-8,8-dicyanoquinodimethane).

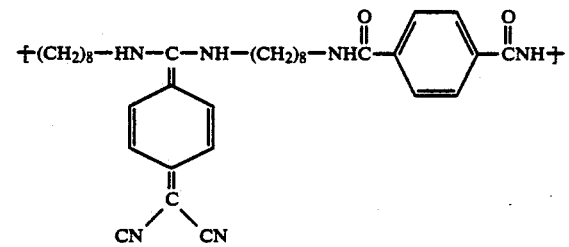

Following the procedure of Example I, a N-methyl-2-pyrrolidone solution of 10 (49 mmoles) of 7,7,8,8-tetracyanoquinodimethane, 14.1 (98 mmoles) of 1,8-diaminooctane and 9.95 g (49 mmoles) of terephthaloyl dichloride is reacted at ambient temperature for three days to yield the poly(7,7-iminooctamethyleneterephthalamidoocta-methyleneimino-8,8-dicyanoquinodimethane) product.

A solution of the polymer in N-methyl-2-pyrrolidone is cast on electroconductive glass to form a transparent medium for use as a nonlinear optical component of an electrooptic light modulator device.

A similar polymer is obtained when isophthaloyl dichloride and/or phthaloyl dichloride replaces part or all of the terephthaloyl dichloride reactant.

EXAMPLE XV

This Example illustrates the preparation of poly(7,7-iminotrimethylenetetramethyldisiloxanetrimethyleneimino-8,8-dicyanoquinodimethane).

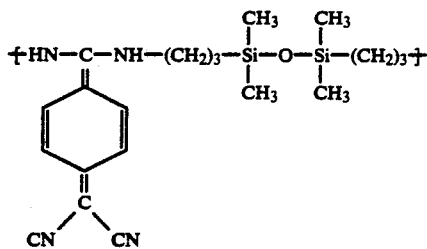

Following the procedure of Example I, a tetrahydrofuran (1375 ml) and N-methyl-2-pyrrolidone (170 ml) solution of 10 g (49 mmoles) of 7,7,8,8-tetracyanoquinodimethane and 12.2 g (49 mmoles) of 1,3-bis(3-aminopropyl)-1,1,3,3-tetramethyldisiloxane is reacted at ambient temperature for three days to yield the poly(7,7-iminotrimethylenetetramethyldisiloxanetrimethyleneimino-8,8-dicyanoquinodimethane) product.

The polymer exotherms at 250° C., and exhibits a uv-visible absorption maximum at 385 nm (log $\epsilon$=4.33) in N-methyl-2-pyrrolidone. The polymer has a molecular weight in the range of 50,000–80,000.

A transparent film is formed on electroconductive glass by coating the glass surface with a N,N-dimethylacetamide solution of the polymer product. The coated glass unit is adapted for utility as a nonlinear optical component of an electrooptic light modulator device.

A similar polymer is obtained if 1,3-bis(3-aminopropyl)-1,3-diphenyl-1,3-dimethyldisiloxane or 1,3-bis(3-aminopropyl)-1,3-dimethyl-1,3-trifluoropropyldisiloxane is the disiloxane reactant.

EXAMPLE XVI

This Example illustrates the preparation of poly(7,7-iminotrimethylenepolydimethylsiloxanetrimethyleneimino-8,8-dicyanoquinodimethane).

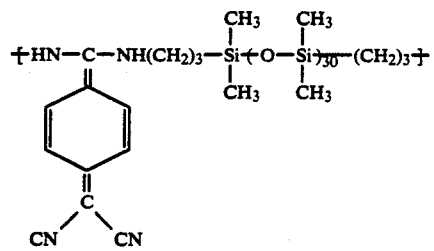

Following the procedure of Example I, a tetrahydrofuran (1375 ml) and N-methyl-2-pyrrolidone (170 ml) solution of 10 g (49 mmoles) of 7,7,8,8-tetracyanoquinodimethane and 117.6 g (49 mmoles) of polydimethylsiloxane terminated with aminopropyl groups (molecular weight of 2400) is reacted at ambient temperature for three days to yield the poly(7,7-iminotrimethylenepolydimethylsiloxanetrimethyleneimino-8,8-dicyanoquinodimethane) product.

The polymer exotherms at 258° C., and exhibits a uv-visible absorption maximum at 394 nm (log $\epsilon$=4.34) in tetrahydrofuran. The polymer has a molecular weight in the range of 120,000–500,000.

In a manner similar to Example XV, the polymer is useful for incorporation in a nonlinear optical component of an electrooptic light modulator device.

EXAMPLE XVII

This Example illustrates the preparation of a copolymer of (7,7-iminotrimethylenetetramethyldisiloxanetrimethyleneimino-8,8-dicyanoquinodimethane) and (7,7-iminotrimethylenepolydimethylsiloxanetrimethyleneimino-8,8-dicyanoquinodimethane).

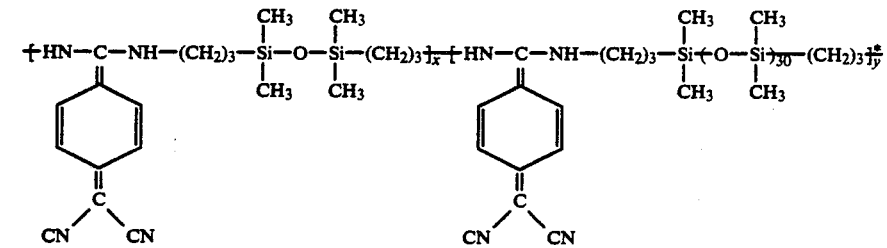

*x:y = 60:40

Following the procedure of Example I, a tetrahydrofuran (1375 ml) N-methyl-2-pyrrolidone (170 ml) solution of 10 g (49 mmoles) of 7,7,8,8-tetracyanoquinodimethane, 7.29 g (29.4 mmoles) of bis(3-aminopropyl)tetramethyldisiloxane and 47.04 g (19.6 mmoles) of polydimethylsiloxane terminated with aminopropyl groups (molecular weight of 2400) is reacted at ambient temperature for three days to yield the copolymer corresponding to the illustrated formula.

The polymer exhibits a uv-visible absorption maximum at 385 nm (log $\epsilon$=4.22) in actone. The polymer has a molecular weight in the range of 60,000–400,000.

In a manner similar to Example XV, the polymer is useful for incorporation in a nonlinear optical component of an electrooptic light modulator device.

EXAMPLE XVIII

This Example illustrates the preparation of a copolymer of (7,7-iminotrimethylenetetramethyldisiloxanetrimethyleneimino-8,8-dicyanoquinodimethane) and (7,7-iminotrimethylenepolydimethylsiloxanetrimethyleneimino-8,8-dicyanoquinodimethane).

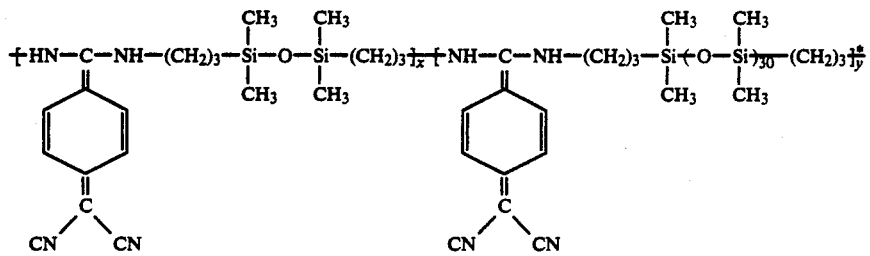

*x:y = 80:20

Following the procedure of Example I, a tetrahydrofuran (1375 ml) N-methyl-2-pyrrolidone (170 ml) solution of 10 g (49 mmoles) of 7,7,8,8-tetracyanoquinodimethane, 9.72 g (39.2 mmoles) of bis(3-aminopropyl)tetramethyldisiloxane and 23.52 g (9.8 mmoles) of polydimethylsiloxane terminated with aminopropyl groups (molecular weight of 2400) is reacted at ambient temperature for three days to yield the copolymer product.

The polymer exhibits a uv-visible absorption maximum at 385 nm (log $\epsilon$=3.96) in acetone. The polymer has a molecular weight in the range of 60,000–500,000.

In a manner similar to Example XV, the polymer is useful for incorporation in a nonlinear optical component of an electrooptic light modulator device.

EXAMPLE XIX

This Example illustrates the preparation of poly(7,7-iminotrimethylenetetraphenyldisiloxanetrimethyleneimino-8,8-dicyanoquinodimethane).

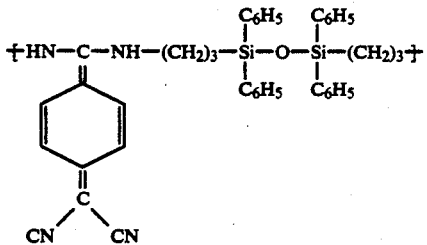

A tetrahydrofuran solution of 10 g (49 mmoles) of 7,7,8,8-tetracyanoquinodimethane and 45.67 g (196 mmoles) of 3-aminopropyldiphenylethoxysilane is reacted at ambient temperature for three days to provide a crude product after evaporation of the solvent. The crude product is treated and washed with hexane to yield 7,7-bis(3-diphenylethoxysilylpropylamino)-8,8-dicyanoquinodimethane.

The actone solution of this compound is cast on glass plate and allowed to hydrolyze and polymerize to form a yellow transparent poly(7,7-iminotrimethylenetetraphenyldisiloxanetrimethyleneimino-8,8-dicyanoquinodimethane) film.

A similar polymer is produced by employing 4-aminobutyldimethylmethoxysilane instead of 3-aminopropyldiphenylethoxysiloxane reactant.

EXAMPLE XX

This Example illustrates the preparation of poly[7,7-iminotrimethylene-1,1,3,5,7,7-hexamethyl-3,5-bis(3,3,3-trifluoropropyl)tetrasiloxanetrimethyleneimino-8,8-dicyanoquinodimethane].

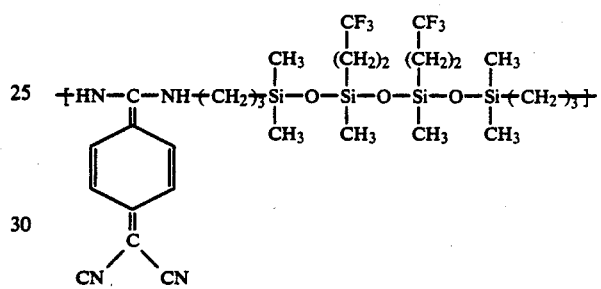

A tetrahydrofuran solution of 10 g (49 mmoles) of 7,7,8,8-tetracyanoquinodimethane and 31.56 g (196 mmoles) of 3-aminopropyldimethylethoxysilane is reacted at ambient temperature for three days to provide a crude product after evaporation of the solvent. The crude product is treated and washed with hexane to yield 7,7-bis(3-dimethylethoxysilylpropylamino)-8,8-dicyanoquinodimethane.

To a stirred mixture of 2.6 g of sodium hydroxide, 11 ml of methanol and 12 ml of water is added 7.5 g (16 mmoles) of 7,7-bis(3-dimethylethoxysilylpropylamino)-8,8-dicyanoquinodimethane. The resulting mixture is stirred for 30 minutes and then poured into a solution of 17 g of potassium dihydrogen phosphate in 30 g of water and ice. After work-up and drying, 7,7-bis(3-dimethylhydroxysilylpropylamino)-8,8-dicyanoquinodimethane is obtained.

A 100 ml three-necked flask, equipped with thermometer, stirrer, nitrogen inlet, and condenser which is connected to a solution of hydrochloric acid, is charged with 5.33 g (12.8 mmoles) of 7,7-bis(3-dimethylhydroxysilylpropylamino)-8,8-dicyanoquinodimethane, 4.41 g (11.52 mmoles) of 1,3-dimethyl-1,3-bis(3,3,3-trifluoropropyl)-1,3-bis(dimethylamino)disiloxane, and 5 ml of toluene. The mixture is warmed to 110° C. during which period dimethylamine begins to evolve. After 15 minutes of heating, 0.49 g (1.28 mmoles) of 1,3-dimethyl-1,3-bis(3,3,3-trifluoropropyl)-1,3-bis(dimethylamino)disiloxane is added dropwise over a period of 10 minutes. The resulting mixture is heated for 1.5 hours and then hydrolyzed with 1 ml of water. The water and toluene are removed as an azeotrope. The resultant polymer product is dissolved in toluene, filtered, precipitated with methanol, and dried to yield poly[(7,7-iminotrimethylene-1,1,3,5,7,7-hexamethyl-3,5-bis(3,3,3- trifluoropropyl)tetrasiloxanetrimethyleneimino-8,8-dicyanoquinodimethane].

A similar polymer is produced by employing bis(-dimethylamino)dimethylsilane or 1,3-bis(dimethylamino)-1,1,3,3-tetramethyldisiloxane instead of 1,3-dimethyl-1,3-bis(3,3,3-trifluoropropyl)-1,3-bis(dimethylamino)disiloxane.

EXAMPLE XXI

This Example illustrates the preparation of poly[1,3-trimethylenetetramethyldisiloxanetrimethylene-2-(4-dicyanomethylenecyclohexa-2,5-dienylidene)imidazolidine].

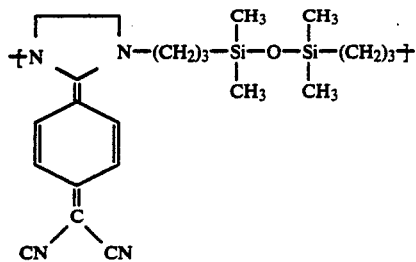

Following the procedure of Example XIX, a tetrahydrofuran (1375 ml) and N-methyl-2-pyrrolidone (20 ml) solution of 10 g (49 mmoles) of 7,7,8,8-tetracyanoquinodimethane and 17.1 g (49 mmoles) of bis[3-ethoxydimethylsilylpropyl]ethylenediamine is reacted at ambient temperature for six days to provide a crude product after evaporation of the solvent. The crude product is treated and washed with hexane to yield 1,3-bis(3-dimethylethoxysilylpropyl)-2-(4-dicyanomethylenecyclohexa-2,5-dienylidine)imidazolidine.

An acetone solution of this compound is cast on glass plate and allowed to hydrolyze and polymerize to form a yellow transparent poly[1,3-trimethylenetetramethyldisiloxanetrimethylene-2-(4-dicyanomethylenecyclohexa-2,5-dienylidine)imidazolidine] film.

EXAMPLE XXII

This Example illustrates the preparation of poly(7,7-iminotrimethylenesilsesquioxane type-trimethyleneimino-8,8-dicyanoquinodimethane).

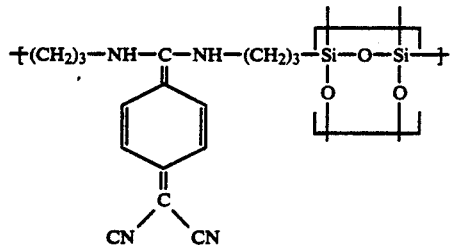

Following the procedure of Example XIX, a tetrahydrofuran (1375 ml) and N-methyl-2-pyrrolidone (20 ml) solution of 10 g (49 mmoles) of 7,7,8,8-tetracyanoquinodimethane and 43.32 g (196 mmoles) of 3-aminopropyltriethoxysilane is reacted at ambient temperature for six days to provide a crude product after evaporation of the solvent. The crude product is treated and washed with hexane to yield 7,7-bis(3-triethoxysilylpropylamino)-8,8-dicyanoquinodimethane.

An acetone solution of this compound is cast on glass plate and allowed to hydrolyze and polymerize to form a yellow transparent polysilsesquioxane type of polymer film containing 7,7-di(iminotrimethylene)-8,8-dicyanoquinodimethane.

A similar polymer is produced by employing 3-aminopropyltrimethoxysilane, N-methylaminopropyltrimethoxysilane, N-phenylaminopropyltrimethoxysilane, 1-trimethoxysilyl-2-(p-m-aminophenyl)ethane or p-aminophenyltrimethoxysilane instead of 3-aminopropyltriethoxysilane.

EXAMPLE XXIII

This Example illustrates the preparation of poly(7,7-iminotrimethylenesilsesquioxane type-trimethyleneimino-8,8-dicyanoquinodimethane).

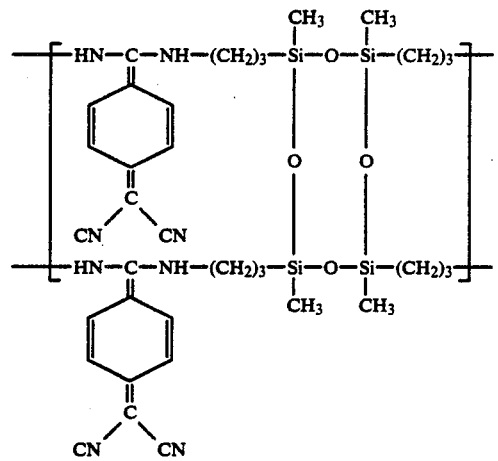

Following the procedure of Example XXII, a tetrahydrofuran (1375 ml) and N-methyl-2-pyrrolidone (20 ml) solution of 10 g (49 mmoles) of 7,7,8,8-tetracyanoquinodimethane and 37.44 g (196 mmoles) of 3-aminopropylmethyldiethoxysilane is reacted at ambient temperature for six days to provide a crude product after evaporation of the solvent. The crude product is treated and washed with hexane to yield 7,7-bis(3-diethoxymethylsilylpropylamino)-8,8-dicyanoquinodimethane.

An acetone solution of this compound is cast on glass plate and allowed to hydrolyze and polymerize to form a yellow transparent ladder polymer film containing 7,7-di(iminotrimethylene)-8,8-dicyanoquinodimethane.

A similar polymer is produce by employing 3-aminopropyldimethoxymethylsilane, N-methylaminopropyldimethoxymethylsilane, N-phenylaminopropyldimethoxymethylsilane, 1-dimethoxymethylsilyl-2-(p-m-aminophenyl)ethane or p-aminophenyldimethoxymethylsilane instead of 3-aminopropyldiethoxymethylsilane.

What is claimed is:

1. A polymer which is characterized by a recurring structural unit corresponding to the formula:

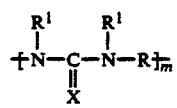

where R is a divalent organic radical containing between about 2-20 carbon atoms; $R^1$ is hydrogen or a $C_1$–$C_{20}$ alkyl group; m is an integer of at least 3; and X is a pendant quinoid substituent selected from

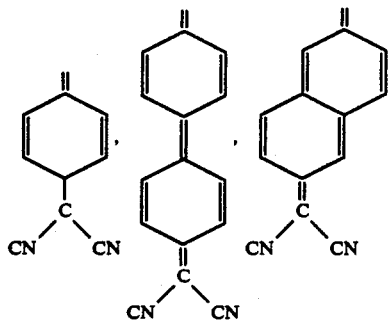

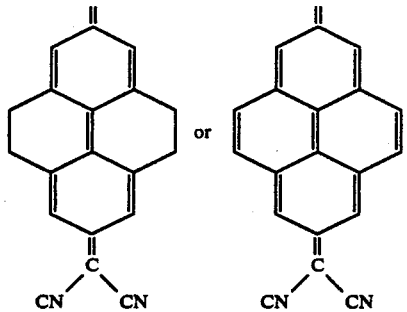

2. A polymer in accordance with claim 1 wherein the polymer exhibits nonlinear optical response.

3. A polymer in accordance with claim 1 wherein the polymer exhibits a second order nonlinear optical susceptibility $\beta$ of at least about $5\times10^{-30}$ esu as measured at 1.91 μm excitation wavelength.

4. A polymer in accordance with claim 1 wherein the polymer exhibits a third nonlinear optical susceptibility $\gamma$ of at least about $1\times10^{-36}$ esu as measured at 1.91 μm excitation wavelength.

5. A polymer in accordance with claim 1 wherein the polymer has an average molecular weight in the range between about 1000–1,000,000.

6. A polymer in accordance with claim 1 wherein the divalent organic radical R contains a polymethylene structure.

7. A polymer in accordance with claim 1 wherein the divalent organic radical R contains an ester structure.

8. A polymer in accordance with claim 1 wherein the divalent organic radical R contains a urethane structure.

9. A polymer in accordance with claim 1 wherein the divalent organic radical R contains a carbonyl structure.

10. A polymer in accordance with claim 1 wherein the divalent organic radical R contains an imide structure.

11. A polymer in accordance with claim 1 wherein the divalent organic radical R contains an amide structure.

12. A polymer in accordance with claim 1 wherein the divalent organic radical R contains an organosiloxyl structure.

13. A transparent nonlinear optical medium comprising a polymer which is characterized by a recurring structural unit corresponding to the formula:

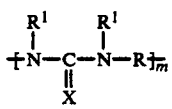

where R is a divalent organic radical containing between about 2–20 carbon atoms; $R^1$ is hydrogen or a $C_1$–$C_{20}$ alkyl group; m is an integer of at least 3; and X is a pendant quinoid substituent selected from

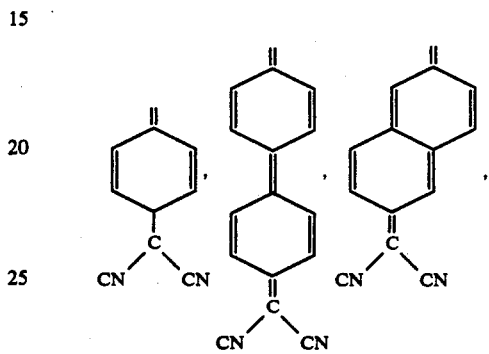

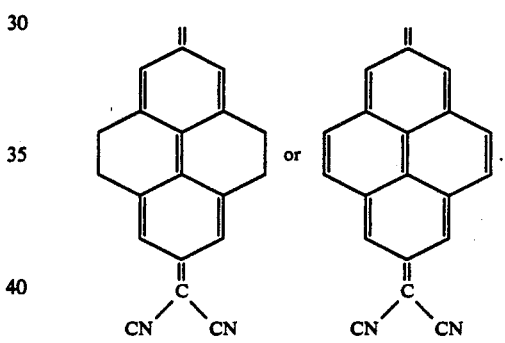

14. A transparent nonlinear optical medium in accordance with claim 13 which is characterized by an external field-induced molecular orientation of the pendant quinoid substituents.

15. A nonlinear optical medium comprising a transparent solid substrate with a surface coating of at least one monolayer of a polymer which is characterized by a recurring structural unit corresponding to the formula:

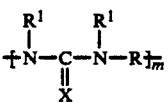

where R is a divalent organic radical containing between about 2–20 carbon atoms; $R^1$ is hydrogen or a $C_1$–$C_{20}$ alkyl group; m is an integer of at least 3; and X is a pendant quinoid substituent selected from

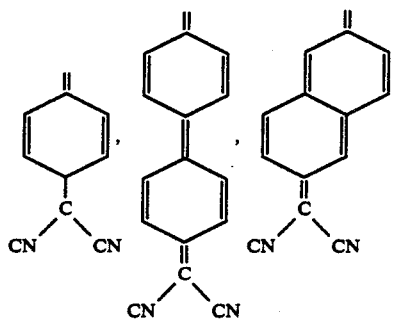

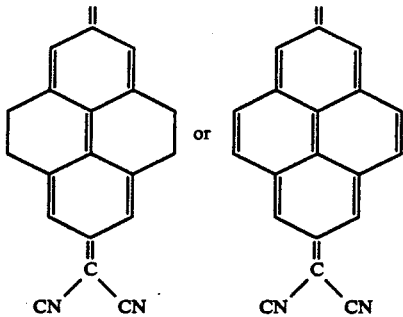

16. A nonlinear medium in accordance with claim 15 wherein the surface coating is a Langmuir-Blodgett deposition of at least one monolayer of uniaxial aligned polymer molecules.

17. A polymer which is characterized by a recurring structural unit corresponding to the formula:

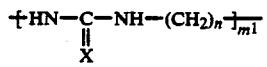

where n is an integer between about 2–30; $m^1$ is an integer between about 3–300; and X is a pendant quinoid substituent selected from

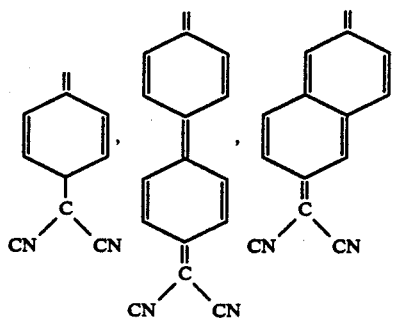

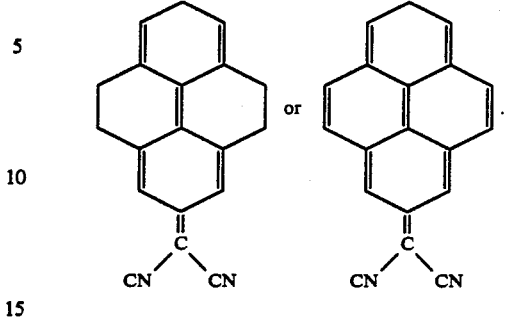

18. A polymer which is characterized by a recurring structural unit corresponding to the formula:

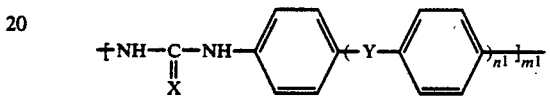

where $n^1$ is an integer between about 0–5; $m^1$ is an integer between about 3–300; Y is —O—, —S—, —(CH$_2$)$_{1-10}$—, —C(CH$_3$)$_2$—, —OCH$_2$CH$_2$O—, —CH=CH—, —C≡C—, or Y is a covalent bond; and X is a pendant quinoid substituent selected from

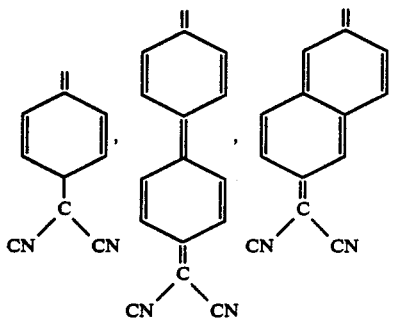

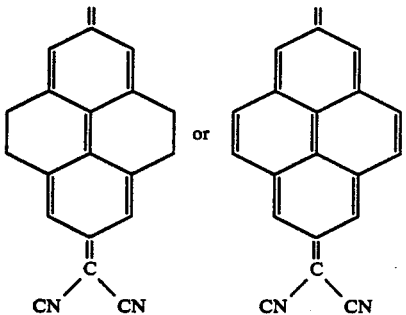

19. A polymer which is characterized by a recurring structural unit corresponding to the formula:

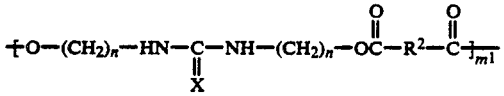

where n is an integer between about 2–30; $m^1$ is an integer between about 3–300; $R^2$ is a divalent radical selected from

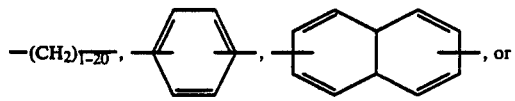

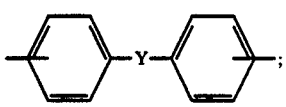

Y is —O—, —S—, —(CH$_2$)$_{1-10}$—, —C(CH$_3$)$_2$—, —OCH$_2$CH$_2$O—, —CH=CH—, —C≡C—, or Y is a covalent bond; and X is a pendant quinoid substituent selected from

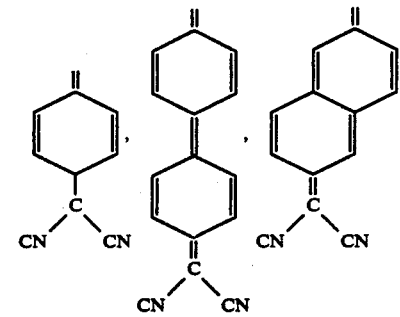

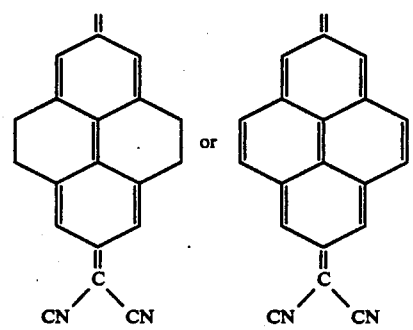

20. A polymer which is characterized by a recurring structural unit corresponding to the formula:

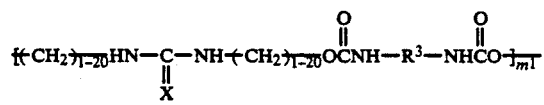

where m$^1$ is an integer between about 3–300; R$^3$ is a divalent radical selected from

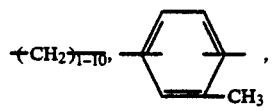

or

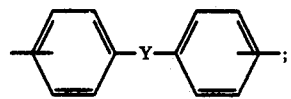

Y is —O—, —S—, —(CH$_2$)$_{1-10}$—, —C(CH$_3$)$_2$—, —OCH$_2$CH$_2$O—, —CH=CH—, —C≡C—, or Y is a covalent bond; and X is a pendant quinoid substituent selected from

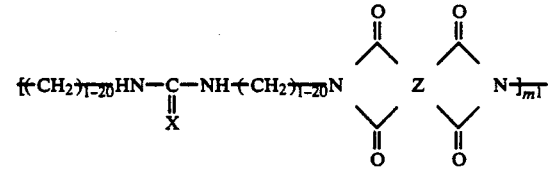

21. A polymer which is characterized by a recurring structural unit corresponding to the formula:

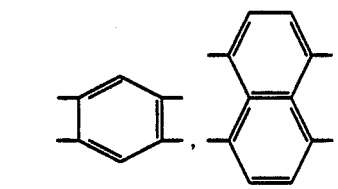

where m$^1$ is an integer between about 3–300; Z is a tetravalent radical selected from

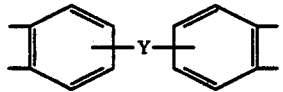

or

Y is —O—, —S—, —(CH$_2$)$_{1-10}$—, —C(CH$_3$)$_2$—, —OCH$_2$CH$_2$O—, —CH=CH—, —C≡C—, or Y is a covalent bond; and X is a pendant quinoid substituent selected from

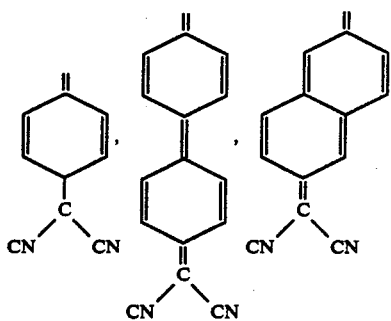

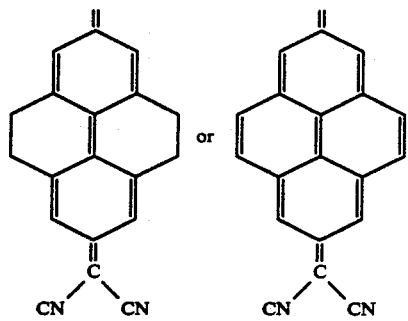

22. A polymer which is characterized by a recurring structural unit corresponding to the formula:

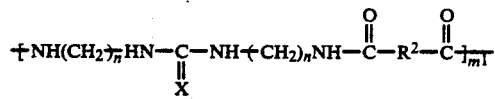

where $m^1$ is an integer between about 3–300; n is an integer between about 0–30; $R^2$ is a divalent radical selected from

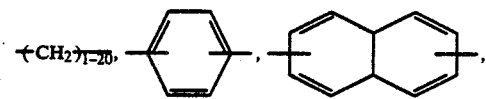

or

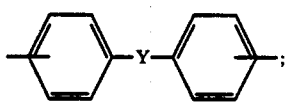

Y is —O—, —S—, —(CH$_2$)$_{1\text{-}10}$—, —C(CH$_3$)$_2$—, —OCH$_2$CH$_2$O—, —CH=CH—, —C≡C—, or Y is a covalent bond; and X is a pendant quinoid substituent selected from

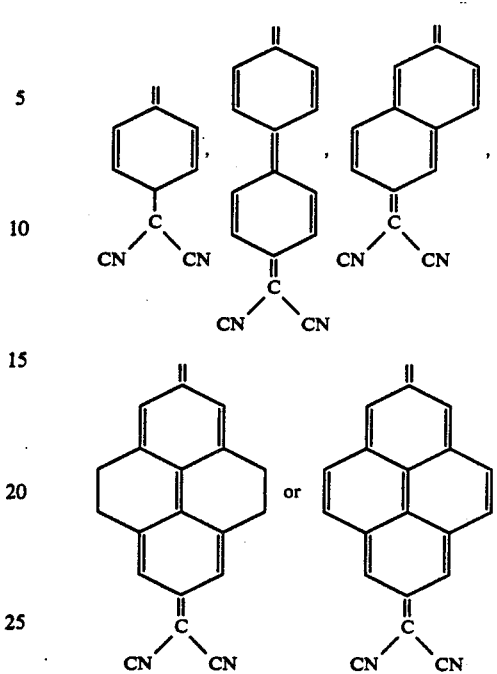

23. A polymer which is characterized by a recurring structural unit corresponding to the formula:

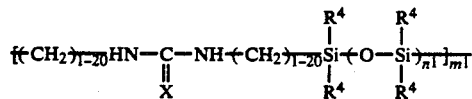

where $m^1$ is an integer between about 3–300; $R^4$ is an alkyl, haloalkyl or aromatic group containing between about 1–10 carbon atoms; $n^1$ is an integer between about 1–100; and X is a pendant quinoid substituent selected from

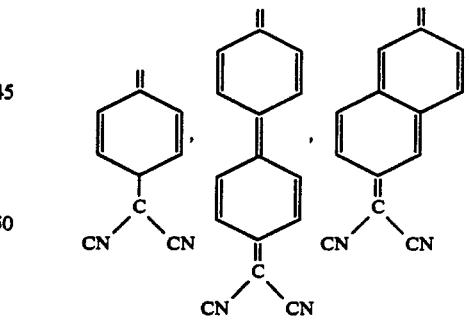

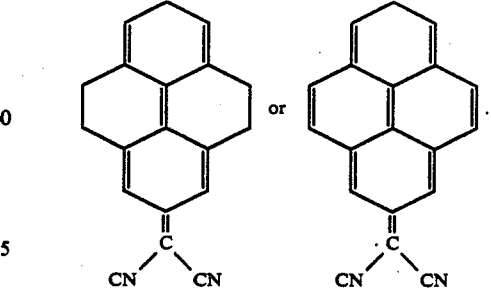

* * * * *